United States Patent
Santos et al.

(10) Patent No.: US 10,394,883 B2
(45) Date of Patent: Aug. 27, 2019

(54) CLASSIFICATION TECHNIQUE FOR MULTI-BAND RASTER DATA FOR SORTING AND PROCESSING OF COLORIZED DATA FOR DISPLAY

(71) Applicant: AGRIAN, INC., Clovis, CA (US)

(72) Inventors: Aaron D. Santos, Clovis, CA (US); Peter H. Brandt, Friant, CA (US)

(73) Assignee: AGRIAN, INC., Clovis, CA (US)

( * ) Notice: Subject to any disclaimer, the term of this patent is extended or adjusted under 35 U.S.C. 154(b) by 0 days.

(21) Appl. No.: 15/858,585

(22) Filed: Dec. 29, 2017

(65) Prior Publication Data

US 2018/0189326 A1 Jul. 5, 2018

Related U.S. Application Data

(60) Provisional application No. 62/440,315, filed on Dec. 29, 2016.

(51) Int. Cl.
*G06F 16/00* (2019.01)
*G06F 16/583* (2019.01)
*G06F 16/51* (2019.01)

(52) U.S. Cl.
CPC .......... *G06F 16/5854* (2019.01); *G06F 16/51* (2019.01)

(58) Field of Classification Search
CPC combination set(s) only.
See application file for complete search history.

(56) References Cited

U.S. PATENT DOCUMENTS

| | | | |
|---|---|---|---|
| 9,697,234 B1* | 7/2017 | Dhua | G06F 16/5846 |
| 2009/0070415 A1* | 3/2009 | Kishi | G06K 9/00463 |
| | | | 709/203 |
| 2011/0272161 A1* | 11/2011 | Kumaran | G01V 1/301 |
| | | | 166/369 |
| 2011/0297369 A1* | 12/2011 | Kumaran | G01V 1/288 |
| | | | 166/250.01 |
| 2012/0163715 A1* | 6/2012 | Murray | G06K 9/4652 |
| | | | 382/167 |
| 2015/0363641 A1 | 12/2015 | Navulur | |

* cited by examiner

*Primary Examiner* — Farhan M Syed
(74) *Attorney, Agent, or Firm* — Lazaris IP

(57) ABSTRACT

A classification framework for processing multi-band raster data for display of content included in such data includes a summarization phase and a retrieval phase. The classification framework generates summary descriptions of the multi-band raster data which are substantially smaller than the raster data itself, and approximates quantile breaks in the multi-band raster data so that storage space used to describe observations and network bandwidth required to retrieve the summary descriptions of the multi-band raster data are reduced, enabling speed improvements at least by faster retrieval and performance of computations for generating displays based on the raster data and for large-scale analysis.

22 Claims, 2 Drawing Sheets

CLASSIFICATION TECHNIQUE FOR MULTI-BAND RASTER DATA FOR SORTING AND PROCESSING OF COLORIZED DATA FOR DISPLAY

CROSS-REFERENCE TO RELATED PATENT APPLICATION(S)

This patent application claims priority to U.S. provisional application 62/440,315, filed on Dec. 29, 2016, the contents of which are incorporated in their entirety herein. In accordance with 37 C.F.R. § 1.76, a claim of priority is included in an Application Data Sheet filed concurrently herewith.

FIELD OF THE INVENTION

The present invention relates to processing of colorized raster data. Specifically, the present invention relates to a system and method of classifying multi-band rasters to approximate breaks in the data to efficiently utilize storage space for retrieval and processing of the rasters for display.

BACKGROUND OF THE INVENTION

A raster is a matrix of cells, or pixels, organized into rows and columns. Each cell contains a value representing some piece of information to be displayed on an interface. Data stored in a raster format may be used to represent specific features such as soil or land-use data, continuous data such as temperature, elevation, or spectral data collected from satellite images and aerial photographs, and maps.

Some rasters have a single band of data measuring a single characteristic, while others have multiple bands. A band is represented by a single matrix of cell values, and a raster with multiple bands contains multiple spatially-coincident matrices of cell values representing the same spatial area. Most satellite images are comprised of multiple bands, and contain values within a range or band of the electromagnetic spectrum. When there are multiple bands, every cell location has more than one value associated with it.

Single-band raster datasets are often classified by partitioning the data into a number of categories, with an equal number of units in each category. Categories with equal numbers of units are referred to as quantiles. In order to determine the range of values that each quantile covers, the data may be sorted and then divided into equal partitions. The lowest and highest value in each quantile forms the range of values. Without any loss of generality, the maximum value of each quantile is retained. The sequence of these maximum values is known as quantile breaks. These quantile breaks are used in the process of colorizing raster data for display.

Classification of multi-band raster datasets poses several challenges. Because the data is comprised of multiple values, it is unclear how to order them such that they can be sorted. It is also unclear how they can be colorized to be displayed on an interface such as a display screen. Existing solutions to these problems involve specifying a function that maps each multi-valued datum into a single numerical value that can be ordered. However, as with single-band break calculations, all data must be retrieved and processed in order to calculate the quantile breaks. One persistent problem with existing techniques is that this data transfer requires substantial processing, and therefore limits performance for large raster datasets.

BRIEF SUMMARY OF THE INVENTION

The present invention is an approach to processing multi-band raster data that generates approximate breaks by applying multiple processing techniques to summarize information within such data. The summarization enables a set of clusters to be generated that describe observations within multi-band raster datasets. Observations may then be synthesized, and further sorted, partitioned and used to calculate quantile breaks, so that the amount of data retrieved when recalling summarized clusters is substantially smaller than the multi-band rasters from which they are derived. The storage space to describe the summarization is therefore substantially smaller than the raster data, and enables faster retrieval and performance of computations for generating displays based on the raster data. The approach of the present invention results in a speed improvement that is at least 10 to 12 times faster than that of a native approach. The reduced amount of I/O processing accounts at least in part for such a speed improvement, with such processing taking on average one-tenth to one-twentieth the time of the native approach.

It is one objective of the present invention to provide a system and method of classifying multi-band raster data. It is another objective of the present invention to provide an approach for generating approximate breaks using a summarization of the multi-band raster data prior to retrieval of that data from a storage location. It is still another objective of the present invention to provide a system and method of processing multi-band raster data for display of content included therein.

Other objects, embodiments, features, and advantages of the present invention will become apparent from the following description of the embodiments, taken together with any accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
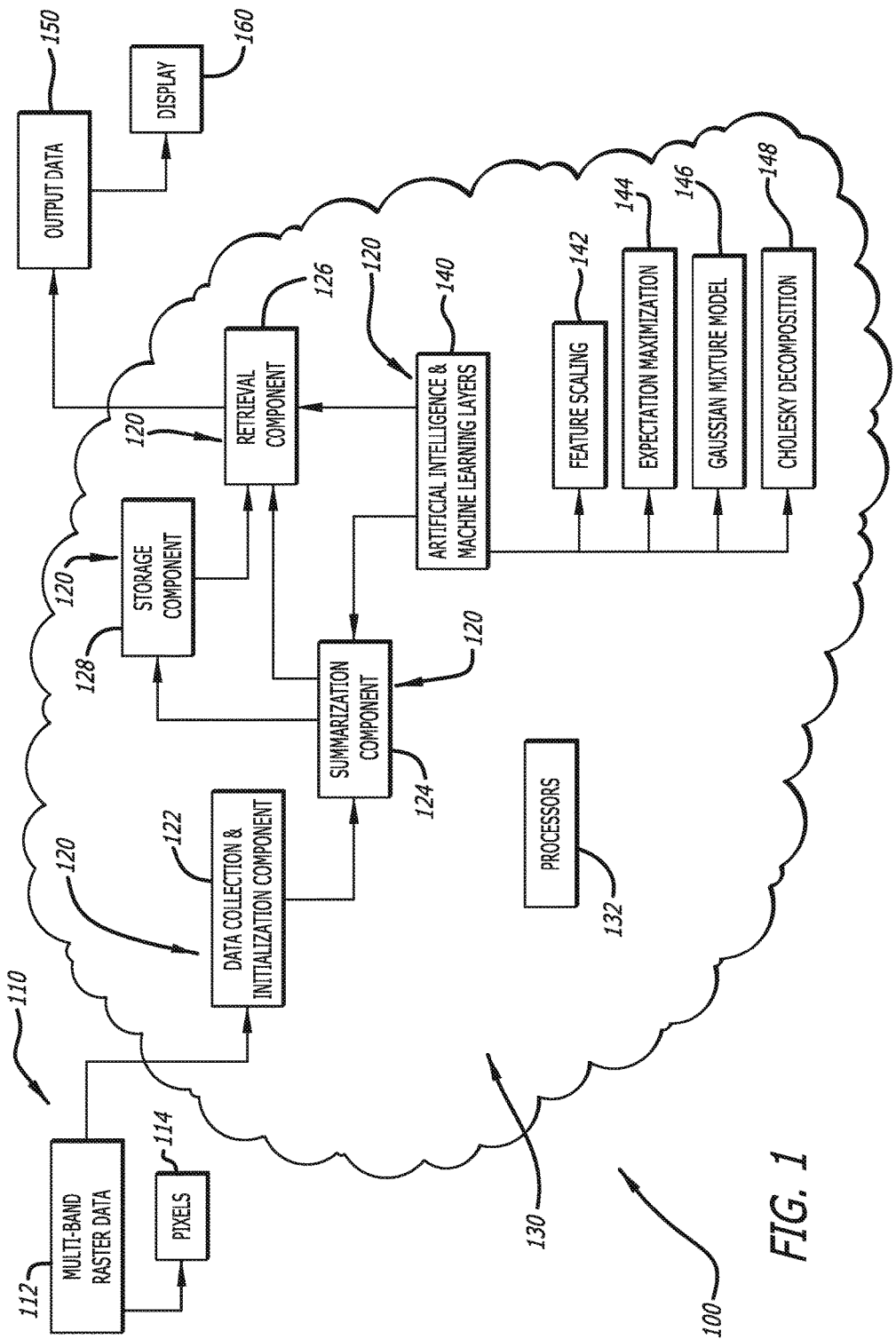
FIG. 1 is a diagram illustrating components in a framework for processing multi-band raster data according to one embodiment of the present invention.

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a classification framework 100 for processing multi-band raster data. The classification framework 100 is performed in two parts: a summarization phase and a retrieval phase. Multi-band raster data 112 is processed using a plurality of data processing functions 120 in this classification framework 100, within a computing environment 130 that includes one or more processors 132 and a plurality of software and hardware components 132. The one or more processors and plurality of software and hardware components 132 are configured to execute program instructions or routines to perform the components and data processing functions described herein, and embodied within the plurality of data processing modules 120 configured to carry out such functions.

FIG. 1 is a system diagram for such a classification framework 100. The classification framework 100 ingests, retrieves, requests, or otherwise obtains input data 110 in the form of multi-band raster data 112 for eventual display on an interface 160, and comprised of a matrix of cells, or pixels 114, each containing a value representing some piece of information to be displayed. This input data 110 is taken into the classification framework 100 by a data collection component 122 in the plurality of data processing components 120, and may be retrieved from one or more database locations, or acquired directly from third party or proprietary sources. Regardless, the classification framework 100 is initialized by intake of the multi-band raster data 112.

This multi-band raster data 112 is provided to a summarization component 124 in the summarization phase of the framework 100. The summarization phase is executed, in one embodiment of the present invention, once for each multi-band raster to be processed, and may take place offline. The summarization phase begins by collecting multi-valued data points, one for each pixel 114 in the raster, with each datum comprised of an ordered list of numerical elements corresponding to each band in the raster. This initial collection of data is referred to as observations.

The observations are first normalized in this summarization phase by finding the mean and standard deviation of the values in each band. The numerical values of these observations are then modified by first subtracting, from each band, the corresponding mean, and then dividing by the corresponding standard deviation. This modification step is an application of a feature scaling technique that standardizes the range of independent variables or features of data to normalize data by selecting for zero mean and unit variance.

In an example of this modifying step, assume there are n observations with m dimensions. The n-th observation of the m-th band has the value $x_{n,m}$. To find the mean for each band $mean_m$, the sum of each band's values is divided by the number of observations, for example $mean_m=(x_{0,m})/n$ to $(x_{n,m})/n$. For each observation, the mean is then subtracted, so that $x'_{n,m}=x_{n,m}-mean_m$. The standard deviation for each band is then calculated (m $s_m=\underline{\sigma}(x'_{0,m}, \ldots, x'_{n,m})$ and the new observations are divided by the standard deviations, represented as $x''_{n,m}=x'_{n,m}/s_m$.

Once the modification step has been performed in the summarization phase, a number of cluster descriptions are selected, and the normalized observations are used to generate a set of clusters of this selected number that describe the approximate distribution of normalized observations relative to each other. The set of clusters may be generated using a Gaussian mixture model 146 as noted below.

The selection of the number of clusters involves a tradeoff between accuracy and storage space (and potentially, with pre-processing time as well). Storage space scales linearly with the number of clusters, while accuracy is likely to be inversely proportional to the number of clusters. In one embodiment, the number of clusters is pre-selected for simplicity, but it is to be understood that the selection of the number of clusters may vary depending on conditions.

The classification framework 100 may also utilize an expectation-maximization algorithm 144 to convert observations into clusters. The expectation-maximization algorithm 144 is a machine learning technique that applies a Gaussian mixture model 146, representing a composite distribution of the observations in the multi-band raster dataset 112. Data points for this composite distribution are drawn from one of k Gaussian sub-distributions, each with its own probability. Once the observations have been converted to clusters, the summarization phase concludes with storing a description of the set of clusters in a storage component 128, for example in one or more database collections, for later retrieval.

The classification framework 100 then continues by activating a retrieval component 126 that performs the retrieval phase. The retrieval phase in the processing of multi-band raster data 112 of the present invention begins by reading one or more sets of cluster descriptions stored in the summarization phase, and synthesizing a collection of observations of these clusters that can then be ordered, partitioned, and used to find the quantile breaks.

To synthesize values for a cluster in the retrieval phase, the present invention first generates a random set of independent and identically distributed (i.i.d) vectors. These random variables have both a zero mean and unit variance. The classification framework then applies an additional machine learning technique to calculate a Cholesky decomposition 148, using a sigma value of the clusters. The result is an m×m matrix by which the classification framework performs a computation representing a multiple of the i.i.d vectors, where each i.i.d. vector is multiplied by the m×m matrix. The present invention then adds the value of a cluster's $m_u$ value to each of the vectors to correctly position the values in the cluster, relative to other clusters.

In this process, a number of random observations are generated, and these observations are manipulated using the cluster descriptions in the summarization phase. In the manipulation process, each cluster is defined as suggested above as a $m_u$ and sigma value. $M_u$ is a multi-dimensional vector with elements corresponding to each band in the multi-band rasters, and describes the placement of the cluster in relation to other clusters. Sigma is an m×m covariance matrix that describes the width and skew of the cluster by quantifying how each dimension relates to each of the others.

The observations are then de-normalized, by first multiplying them by the previously-calculated standard deviation, and then summing them by the previously-calculated means. The resulting collection of transformed and de-normalized observations are referred to as the synthesized observations.

The synthesized observations generated above approximate distribution in the original collection of observations taken from the multi-band rasters. Just as the original observations may be sorted, partitioned and used to calculate breaks, so too can the synthesized observations. Each synthesized observation is projected by applying a projection function $f(R'')\rightarrow R$ to form a sequence of x:R. Since (R, ≤) forms a totally ordered set, they can be naturally sorted in ascending order and subsequently placed for categorization. It is to be noted that the function f belongs to a category of functions where $F=(R'')\rightarrow R$, and any arbitrary f:F will suffice. The result is that the amount of data retrieved when recalling the cluster summarization is substantially smaller than the multi-band rasters from which they are derived. The cluster descriptions can also be fetched in bulk, as opposed to one retrieval per raster. The classification framework 100 of the present invention is also friendly to parallel execution, such that multiple processes may synthesize observations, concurrently partition them into quantiles, and combine intermediate quantiles to arrive at a final set of quantiles from which breaks can be derived.

Figure 2:
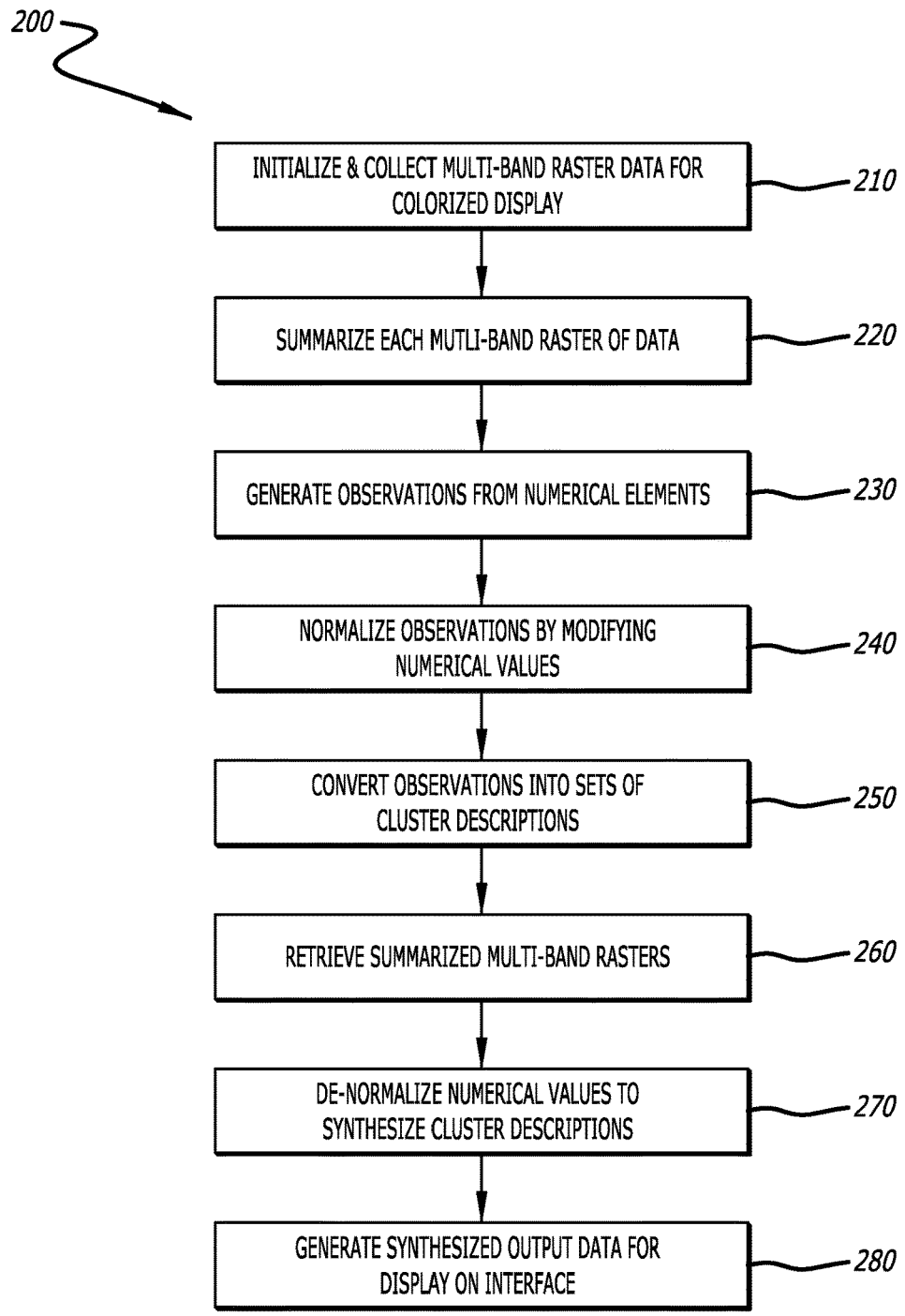
FIG. 2 is a flowchart of steps in a process of performing a framework for processing multi-band raster data according to one embodiment of the present invention.

FIG. 2 is a flowchart illustrating a process 200 for performing the classification framework 100 of the present invention. The process 200 begins at step 210 by initializing and collecting a multi-band rasterized dataset 112 for colorized display on an interface 160. At step 220, the process 200 summarizes the multi-band raster data in a summarization phase, by initially generating a set of observations from numerical elements collected from, and corresponding to, each band in the multi-band raster dataset 112 at step 230.

The summarization phase continues at step 240, by modifying numerical values in the set of observations to normalize them, by applying feature scaling 142 to calculate a mean and standard deviation of numerical values in each band. At step 250, the summarization phase then converts these normalized observations in a set of clusters, and stores descriptions of these sets of clusters for later retrieval in a retrieval and preparation phase of the framework 100.

A retrieval phase of the classification framework 100 is then initialized beginning at step 260, where summarized cluster descriptions representing multi-band rasters are retrieved in preparation for display of the multi-band raster data 110. Numerical values are then de-normalized to synthesize the cluster descriptions at step 270, for example by generating a random set of independent, identically distributed vectors to approximate quantile breaks in the multi-band raster data 112. Output data 150 is then generated and prepared for display of the data 112 on an interface at step 280.

The plurality of data processing components within the classification framework 100 of the present invention incorporates and applies one or more mathematical functions or models, which may include one or more layers of machine learning or artificial intelligence 140. These one or more machine learning and artificial intelligence layers 140 are applied to characterize the data points within the multi-band raster dataset, and observations developed from them, and comprise models that may be utilized to develop predictions based on these observations and correlations between data points across the different bands of raster data to normalize the set of observations and convert them into a set of clusters.

In one example of the use of such machine learning and artificial intelligence models 140, a feature scaling technique 142 may be applied to standardize a range of independent variables or features of data among the data points in a multi-band raster data set. Since the range of values of in a set of raw multi-band raster data may vary widely, the range of all features needs to be normalized so that each feature contributes approximately proportionately. Other examples of machine learning in the present invention, as noted herein, include an expectation-maximization algorithm that is a technique of machine learning hat applies a Gaussian mixture model that evaluates data points in the multi-band raster of data drawn from one of k Gaussian sub-distributions, each having its own probability of relevancy to sorting and processing of colorized data for display. Another example is a technique used to calculate a Cholesky decomposition, using a sigma value of cluster descriptions to perform computations representing multiple of independent and identically distributed vectors. Regardless, it is to be understood that many specific techniques and calculations involved machine learning and artificial intelligence may be performed within the data processing components 120 and mathematical modeling functions therein.

The present invention may also utilize hierarchical and iterative training of machine learning algorithms to improve predictions based on these observations and correlations between data points across the different bands of raster data. Regardless, it is to be understood that the present invention contemplates that many different types of machine learning and artificial intelligence 140 may be employed within the scope thereof, and therefore, the one or more machine learning and artificial intelligence layers 140 may include one or more of such types of machine learning and artificial intelligence. These models may apply techniques that include, but are not limited to, k-nearest neighbor (KNN), logistic regression, support vector machines or networks (SVM), and one or more neural networks. Regardless, the use of machine learning and artificial intelligence in the classification framework 100 of the present invention automatically and heuristically constructing appropriate relationships between data points, mathematically or otherwise, at least to normalize the set of observations and convert them into a set of clusters.

The systems and methods of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, non-transitory or otherwise, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the present invention may apply additional machine learning techniques, and/or other models, to convert observations into clusters for multi-band datasets. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of classifying multi-band raster data for a display of colorized data, comprising:
   summarizing a multi-band raster dataset, by
      collecting a plurality of numerical elements corresponding to each band in the multi-band raster dataset to generate a set of observations,
      modifying numerical values in the set of observations by applying feature scaling to normalize the set of observations by calculating a mean and standard deviation of numerical values in each band, and
      converting the observations into a set of clusters representing an approximate distribution of normalized observations relative to each other by applying a Gaussian mixture model representing a composite distribution of the observations in the multi-band raster dataset, wherein data points representing the observations for the composite distribution are drawn from one of k Gaussian sub-distributions, each observation having its own probability;
   retrieving and preparing summarized multi-band rasters for display, by de-normalizing the numerical values to synthesize the set of clusters, and generating a random set of independent, identically distributed vectors to calculate a Cholesky decomposition of the set of clusters to produce a m×m matrix that quantifies a relation between each band in the multi-hand raster dataset, and multiplying each of the independent, identically distributed vectors by the m×m matrix to generate an approximate range of values representing each synthesized observation;
   projecting each synthesized observation in the set of clusters by applying a projection function to convert values corresponding to pixels in each synthesized observation into single numbers, to form a sequence of single numbers representing the multi-band raster dataset;
   partitioning the sequence of single numbers representing the multi-band raster dataset into intermediate quantiles of equally-sized groups of the single numbers; and
   combining intermediate quantiles to form a final set of quantiles having a plurality of quantile breaks derived by representing each group by its highest and lowest values to identify values for colorization in the multi-band raster dataset.

2. The method of claim 1, wherein the retrieving and preparing summarized multi-band rasters further comprises generating a number of random observations, and manipulating the number of random observations using the set of clusters by multiplying by the standard deviation, and summing by the means.

3. The method of claim 1, wherein the collecting a plurality of numerical elements corresponding to each band in the multi-band raster dataset to generate a set of observations further comprises collecting a multi-valued data point for each pixel in the multi-band raster dataset.

4. The method of claim 1, wherein the modifying numerical values in the set of observations further comprises subtracting, from each band, a corresponding mean, and then dividing by a corresponding standard deviation.

5. The method of claim 1, wherein the feature scaling to normalize the set of observations further comprises selecting for zero mean and unit variance.

6. The method of claim 1, wherein the retrieving and preparing summarized multi-band rasters further comprises calculating a sigma value of the clusters describing the width and skew of the clusters, and a multi-dimensional vector representation having elements corresponding to each band in the multi-band raster dataset.

7. The method of claim 6, further comprising generating a multiple of the vectors, and adding the value of a cluster's multi-dimensional vector to each of the vectors to correctly position the values in a set of clusters, relative to other clusters, so that the sigma value and the multi-dimensional vector value together describe a placement of each cluster in relation to other clusters in the set of clusters.

8. The method of claim 1, further comprising generating a display of the multi-hand raster dataset.

9. A system, comprising:
   a summarization component configured to classify multi-band rasters of data to be displayed, by collecting a plurality of numerical elements corresponding to each band in the multi-band rasters of data to generate a set of observations, modifying numerical values in the set of observations by applying feature scaling to normalize the set of observations by calculating a mean and standard deviation of numerical values in each band, and converting the observations into a set of clusters representing an approximate distribution of normalized observations relative to each other by applying a Gaussian mixture model representing a composite distribution of the observations in the multi-band raster dataset, wherein data points representing the observations for the composite distribution are drawn from one of k Gaussian sub-distributions, each observation having its own probability, and storing the set of clusters for subsequent retrieval and preparation for display; and a retrieval component configured to prepare the summarized multi-band rasters for display, by de-normalizing the numerical values to synthesize the set of clusters, and generating a random set of independent, identically distributed vectors to calculate a Cholesky decomposition of the set of clusters to produce a m×m matrix that quantifies a relation between each band in the multi-band raster dataset, and multiplying each of the independent, identically distributed vectors by the m×m matrix to generate an approximate range of values representing each synthesized observation, projecting each synthesized observation in the set of clusters by applying a projection function to convert values corresponding to pixels in each synthesized observation into single numbers and to form a sequence of single numbers representing the multi-band raster dataset, partitioning the sequence of single numbers representing the multi-band raster dataset into intermediate quantiles of equally-sized groups of the single numbers, and combining intermediate quantiles to form a final set of quantiles having a plurality of quantile breaks derived by representing each group by its highest and lowest values to identify values for colorization in the multi-band raster dataset.

10. The system of claim 9, wherein the retrieval component is further configured to generate a number of random observations, and manipulate the number of random observations using the set of clusters by multiplying by the standard deviation, and summing by the means.

11. The system of claim 9, wherein the summarization component is further configured to collect a multi-valued data point for each pixel in the rasters of data.

12. The system of claim 9, wherein the summarization component is further configured to subtract, from each band, a corresponding mean, and then divide by a corresponding standard deviation.

13. The system of claim 9, wherein the feature scaling to normalize the set of observations further includes selecting for zero mean and unit variance.

14. The system of claim 9, wherein the synthesizing the set of clusters further comprises calculating a sigma value of the clusters describing the width and skew of the cluster and a multi-dimensional vector representation having elements corresponding to each band in the multi-band raster of data.

15. The system of claim 14, wherein the retrieval component is further configured to generate a multiple of the vectors, and add the value of a cluster's multi-dimensional vector to each of the vectors to correctly position the values in a set of clusters, relative to other clusters, so that the sigma value and the multi-dimensional vector value together describe a placement of each cluster in relation to other clusters in the set of clusters.

16. A method, comprising:
collecting a plurality of numerical elements corresponding to each band in a multi-band raster of data to be displayed to generate a set of observations;

normalizing the set of observations by calculating a mean and standard deviation of numerical values in each band to modify numerical values in the set of observations;

applying a Gaussian mixture model to convert the observations into a set of cluster descriptions representing an approximate distribution of normalized observations relative to each other, wherein data points representing the observations for the composite distribution are drawn from one of k Gaussian sub-distributions, each observation having its own probability;

de-normalizing the numerical values by calculating a Cholesky decomposition of the set of clusters to produce a m×m matrix that quantifies a relation between each band in the multi-band raster dataset, and multiplying each of the independent, identically distributed vectors by the m×m matrix to approximate a range of values representing each synthesized observation;

applying a projection function to convert values corresponding to pixels in each synthesized observation into single numbers by projecting each synthesized observation in the set of clusters, to form a sequence of single numbers representing the multi-band raster dataset;

partitioning the sequence of single numbers representing the multi-band raster dataset into intermediate quantiles of equally-sized groups of the single numbers;

identifying values for colorization in the multi-band raster dataset, by combining intermediate quantiles to form a final set of quantiles having a plurality of quantile breaks derived by representing each group by its highest and lowest values; and generating a display of the multi-band raster of data.

17. The method of claim 16, wherein the synthesizing the normalized observations further comprises generating a number of random observations, and manipulating the number of random observations using the set of cluster descriptions by multiplying by the standard deviation, and summing by the means.

18. The method of claim 16, wherein the collecting a plurality of numerical elements corresponding to each band in the multi-band rasters of data to generate a set of observations further comprises collecting a multi-valued data point for each pixel in the rasters of data.

19. The method of claim 16, wherein the modifying numerical values in the set of observations further comprises subtracting, from each band, a corresponding mean, and then dividing by a corresponding standard deviation.

20. The method of claim 16, further comprising applying feature scaling to normalize the set of observations, the feature scaling including selecting for zero mean and unit variance.

21. The method of claim 16, wherein the synthesizing the set of cluster descriptions further comprises calculating a sigma value of the clusters describing the width and skew of the cluster and a multi-dimensional vector representation having elements corresponding to each band in the multi-band raster of data.

22. The method of claim 21, further comprising generating a multiple of the vectors, and adding the value of a cluster description's multi-dimensional vector to each of the vectors to correctly position the values in a set of cluster descriptions, relative to other cluster descriptions, so that the sigma value and the multi-dimensional vector value together describe a placement of each cluster in relation to other clusters in the set of cluster descriptions.

* * * * *